US006980987B2

(12) United States Patent  (10) Patent No.: US 6,980,987 B2
Kaminer  (45) Date of Patent: Dec. 27, 2005

(54) GRAPHICAL USER INTERFACE-RELATIONAL DATABASE ACCESS SYSTEM FOR A ROBOTIC ARCHIVE

(75) Inventor: William W. Kaminer, Washington, TX (US)

(73) Assignee: Alto Technology Resources, Inc., Houston, TX (US)

( * ) Notice: Subject to any disclaimer, the term of this patent is extended or adjusted under 35 U.S.C. 154(b) by 337 days.

(21) Appl. No.: 10/186,500

(22) Filed: Jun. 28, 2002

(65) Prior Publication Data

US 2004/0002989 A1    Jan. 1, 2004

(51) Int. Cl.[7] .......................... G06F 17/30; G06F 7/00
(52) U.S. Cl. ........................................ 707/6; 707/200
(58) Field of Search ................................ 707/6, 200

(56) References Cited

U.S. PATENT DOCUMENTS

| | | | |
|---|---|---|---|
| 5,164,909 A | 11/1992 | Leonhardt et al. | |
| 6,081,857 A | 6/2000 | Frary | |
| 6,230,200 B1 | 5/2001 | Forecast et al. | |
| 6,327,594 B1 * | 12/2001 | Van Huben et al. | ........ 707/200 |
| 6,330,572 B1 | 12/2001 | Sitka | |
| 6,397,308 B1 | 5/2002 | Ofek et al. | |
| 6,675,164 B2 * | 1/2004 | Kamath et al. | ................ 707/6 |
| 2002/0046215 A1 | 4/2002 | Petrocelli | |

FOREIGN PATENT DOCUMENTS

WO    WO 01/42922 A1    6/2001

OTHER PUBLICATIONS

"Managing an Optical Library." *IBM Technical Disclosure Bulletin*, Jul. 1990, p. 378-381.
"Multimedia Medical Data Archive and Retrieval Server on the Internet," *SPIE*, vol. 3035, p. 72-75.
"Design Considerations for Medical Image Archive System," p. 1-26.
"Digital Library Technical Committee".
"White Paper: Planning Your Backup Architecture".

* cited by examiner

*Primary Examiner*—Mohammad Ali
*Assistant Examiner*—Thanh-Ha Dang
(74) *Attorney, Agent, or Firm*—Timothy J. Hadlock

(57) ABSTRACT

The invention includes a system for data file archival management including: a robotic data storage system having multiple non-volatile storage media, input and output means for reading and writing to the storage media, adapted and configured for storing data files, and having a command-line software code portion adapted and configured to provide a command-line user interface to control the robotic tape data storage system; a server; a business logic software code portion resident in memory on the server, configured and adapted for adding and searching metadata about the data files, where the metadata is organized as a relational database; a plurality of personal computers or workstation clients connected to the server computer over a network; a GUI software code portion resident in the memory of the personal computers, workstations, or of a server in communication with the personal computers or workstations, configured and adapted for providing a graphical user interface to at least a portion of the business logic software code portion; and a translation software code portion resident in the memory of the database server adapted and configured for translating adding, deleting, updating, and searching messages from a format compatible with the business logic code portion into and from a format compatible with the command-line code portion.

23 Claims, 16 Drawing Sheets

Fig. 10

Date Acquired (mm/dd/yyyy)  □ / □ / □

Path □  Row □
Internal Department ID ▭
Vendor ID ▭

Sensor

List of sensors from which to select 1.

Previous | Next | Specify Another Sensor | Remove Sensor

Fig. 14

Query Definition Form

| Field | Show Field | Specify Criteria | Sort Field | Display Order | Sort Order |
|---|---|---|---|---|---|
| Name | ☐ | ☐ | ☐ | ☐ | ☐ |
| Annotation | ☐ | ☐ | ☐ | ☐ | ☐ |
| Project | ☐ | ☐ | ☐ | ☐ | ☐ |
| Processor | ☐ | ☐ | ☐ | ☐ | ☐ |
| Customer | ☐ | | | | |
| | | | | | |
| Archive Data | ☐ | ☐ | | ☐ | ☐ |
| File None | ☐ | ☐ | | ☐ | ☐ |

Actions    Options    Help

QUERY DATABASE

| Query Result Form | | |
|---|---|---|
| No. of Records Returned: 25 | | |
| Name | Annotation | ACQ |
| Record One Name | Record One Annotation | June |

Actions | Options | Help

List Files | Print Query Results | New Query

Fig. 15

GRAPHICAL USER INTERFACE-RELATIONAL DATABASE ACCESS SYSTEM FOR A ROBOTIC ARCHIVE

I. FIELD OF THE INVENTION

This invention relates to a system and method for storing, maintaining, and retrieving large data archives from a robotic storage system.

II. BACKGROUND OF THE INVENTION

Hyperspectral mapping and imaging requires storage of large amounts of data. For a single map of a relatively small area this can be gigabytes of data. This data can be stored on high volume storage media such as magnetic tape or optical storage device; however, this can require the use of large numbers of tapes, CD's, DVD's. Hyperspectral imaging jobs may require careful selection of different data sets for a given job or assessment. For a given job the required data may be stored on a number of different storage media. Selection and retrieval of storage media can be cumbersome and time consuming and can require a specialist familiar with the storage system. Commercially available data archiving at best consists of using robotic systems to archive data and the meager identification of that data provided by the software used to drive the robotics hardware. A fairly comprehensive knowledge of that software is required and it is often necessary to be a system administrator in order to actually use it. Also the location on a given storage media of specific data is often poorly documented or mapped. The problem is the need to archive many gigabytes of data in well mapped locations that can be easily and quickly retrieved and accessed by general users and not require manual processing of a request. It is also important to be able to access and retrieve well defined subsets of archived data. The customized data needs to be available on short notice and be available directly to the end user without any handling by a system administrator or specialist. The user interface must also be easily useable by the end user with minimal training.

The present invention provides a method for automated archiving and restoration of data using a relational database that is simple and straightforward for use by the general user and overcomes the problems discussed above.

III. SUMMARY OF THE INVENTION

It is an object of this invention to reduce the time needed to create archives, to search archives, and to retrieve files in archives, for data collected via remote sensing and stored on robotic storage systems.

It is further an object of this invention to present a simplified, intuitive-to-use interface for users to create archives, to search archives, and to retrieve files in archives, for data collected via remote sensing and stored on robotic storage systems.

It is further an object of this invention to provide a system architecture permitting users remote access over a network for creating archives, searching archives, and retrieving files in archives, for data collected via remote sensing and stored on robotic storage systems.

Accordingly, the invention in one embodiment is a system including a server; a business logic software code portion resident in memory of the server, configured and adapted for managing and searching a relational database containing metadata about data files stored in a robotic archive system having multiple non-volatile storage media, input and output means for reading and writing to the storage media, adapted and configured for storing data files, and having a command-line software code portion adapted and configured to provide a command-line user interface to control the robotic data storage system; a GUI software code portion resident in the memory of the server configured and adapted for providing over a network to a personal computer client or workstation client a graphical user interface to at least a portion of the business logic software code portion; and a translation software code portion resident in the memory of a server adapted and configured for translating management and search messages from a format compatible with the business logic code portion into and from a format compatible with the command-line code portion the robotic data storage system.

In an alternate embodiment, the invention includes a method for data-file archival management including: receiving user selected or entered metadata of a plurality of data files via a graphical user interface displayed on a client comprising a personal computer or workstation, wherein the data file is stored in a robotic archival system; storing the metadata in one or more tables of a relational database running on a server connected over a network to the client; receiving a query of the relational data by receiving user-selected or entered metadata parameters into the graphical user interface and rendering the query into a format compatible with the relational database; processing the query on the server and returning to and displaying on the client a report listing one or more of the data files meeting the metadata parameters of the query, wherein the report includes a file locator compatible with the robotic archival system for each data file in the report; receiving a user selection via the graphical user interface of one or more of the data files in the report; translating the selection request to one compatible with the robotic archival system and passing the translated selection request to the robotic archival system; and returning a copy of the selected data files over a network from the robotic archival system to the client.

In an alternate embodiment, the invention includes a system for data file archival management including: a robotic data storage system having multiple non-volatile storage media, input and output means for reading and writing to the storage media, adapted and configured for storing data files, and having a command-line software code portion adapted and configured to provide a command-line user interface to control the robotic tape data storage system; a server; a business logic software code portion resident in memory on the server, configured and adapted for adding, deleting, updating, and searching metadata about the data files, where the metadata is organized as a relational database; a plurality of personal computers or workstation clients connected to the server computer over a network; a GUI software code portion resident in the memory of the personal computers, workstations, or of a server in communication with the personal computers or workstations, configured and adapted for providing a graphical user interface to at least a portion of the business logic software code portion; and a translation software code portion resident in the memory of the database server adapted and configured for translating adding, deleting, updating, and searching messages from a format compatible with the business logic code portion into and from a format compatible with the command-line code portion.

In another embodiment, the invention includes a method for data-file archival management including: selecting or entering metadata of a plurality of data files via a graphical user interface running on a client comprising a personal computer, workstation, or server, where the data file is stored in a robotic archival system; storing the metadata in one or more tables of a relational database running on a server; querying the relational data by selecting or entering metadata parameters into the graphical user interface that is then rendered in a format compatible with the relational database; processing the query on the server and returning to and displaying on the client a report of one or more of the data files meeting the metadata parameters of the search, where the report includes a file locator for each data file compatible with the robotic archival system; selecting via the graphical user interface one or more of the data files; translating the selection request to one compatible with the robotic archival system and passing the translated selection request to the robotic archival system; and returning a copy of the selected data files over a network from the robotic archival system to the client.

In another embodiment, the invention includes a computer-readable media tangibly embodying a program of instructions executable by a computer to perform a method of data-file archival management including: computer readable program code means for receiving from a user a selection or input of metadata of a plurality of data files via a graphical user interface, wherein the data file is stored in a robotic archival system; computer readable program code means for storing the metadata in one or more tables of a relational database; computer readable program code means for receiving a user query to the relational data by receiving user selections or text entry metadata parameters into a graphical user interface that is then rendered in a format compatible with the relational database; computer readable program code means for processing the query and returning to and displaying on the user a report of one or more of the data files meeting the metadata parameters of the search, wherein the report includes a file locator for each data file compatible with the robotic archival system; computer readable program code means for receiving a user selection via the graphical user interface one or more of the data files; computer readable program code means for translating the selection request to one compatible with the robotic archival system and passing the translated selection request to the robotic archival system; and computer readable program code means for returning a copy of the selected data files over a network from the robotic archival system to the user.

These and other features and advantages of the present invention will be made more apparent through a consideration of the following detailed description of a preferred embodiment of the invention. In the course of this description, frequent reference will be made to the attached drawings.

IV. BRIEF DESCRIPTION OF THE DRAWINGS

Figure 8:
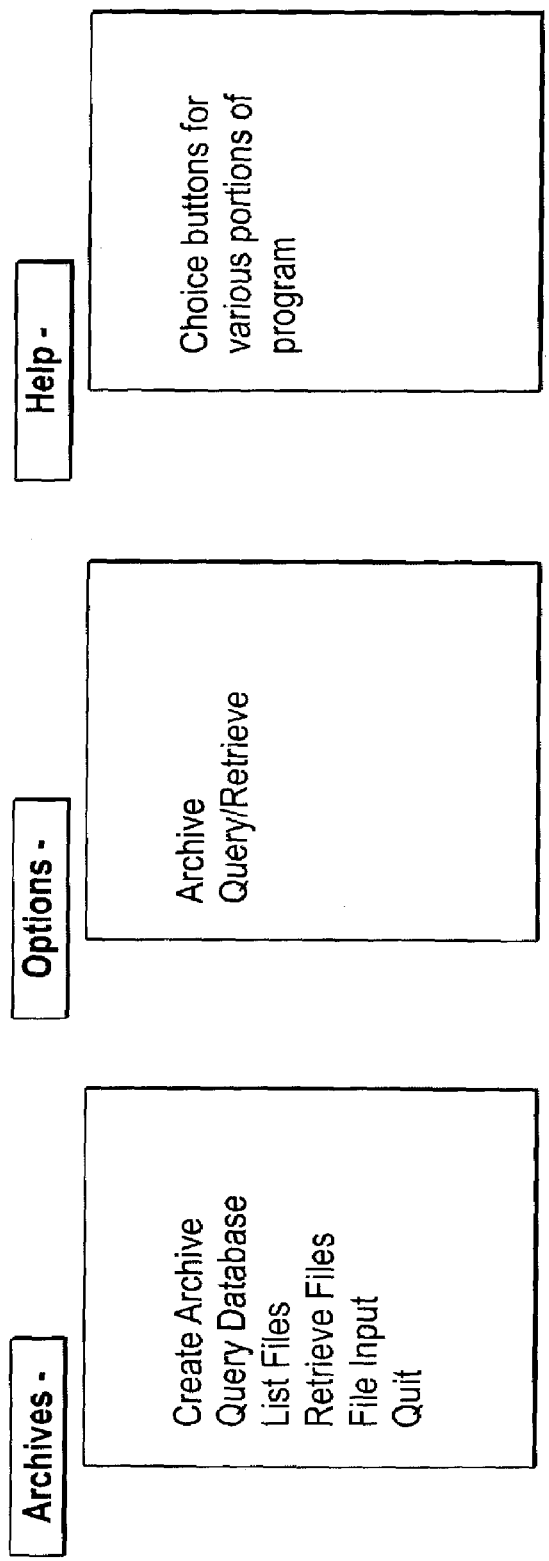

FIGS. 8a, 8b, and 8c are schematic diagrams of one embodiment of the selectable list functionality available via the Actions, Options, and Help buttons, respectively, of the Archive Options screen of the graphical user interface aspect of the invention.

Figure 9:
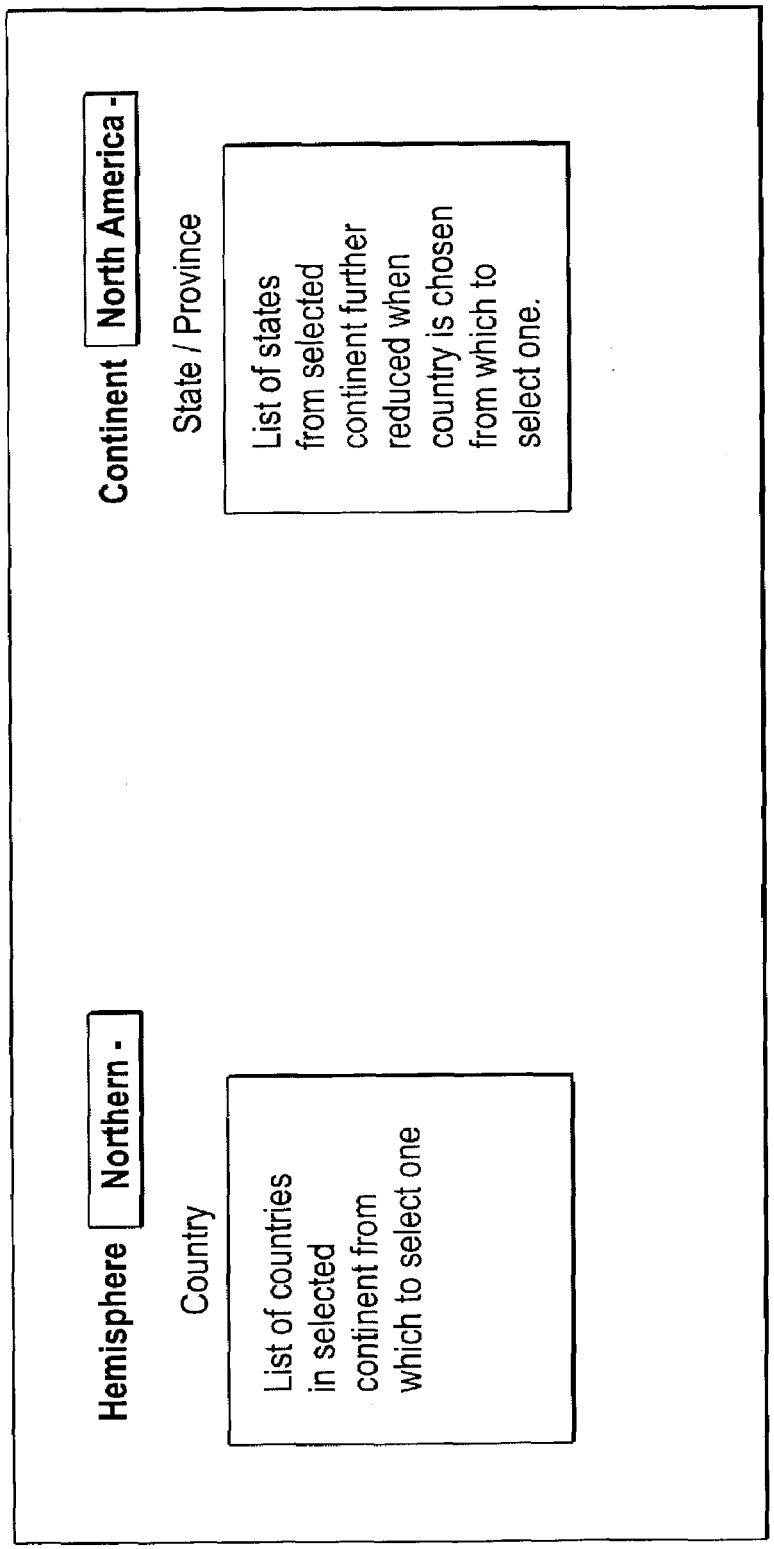

FIG. 9 is a schematic diagram one embodiment of the Geographic Subscreen of the Archive Options screen of the graphical user interface aspect of the invention.

FIG. 10 is a schematic diagram one embodiment of the Acquisition Subscreen of the Archive Options screen of the graphical user interface aspect of the invention.

Figure 11:
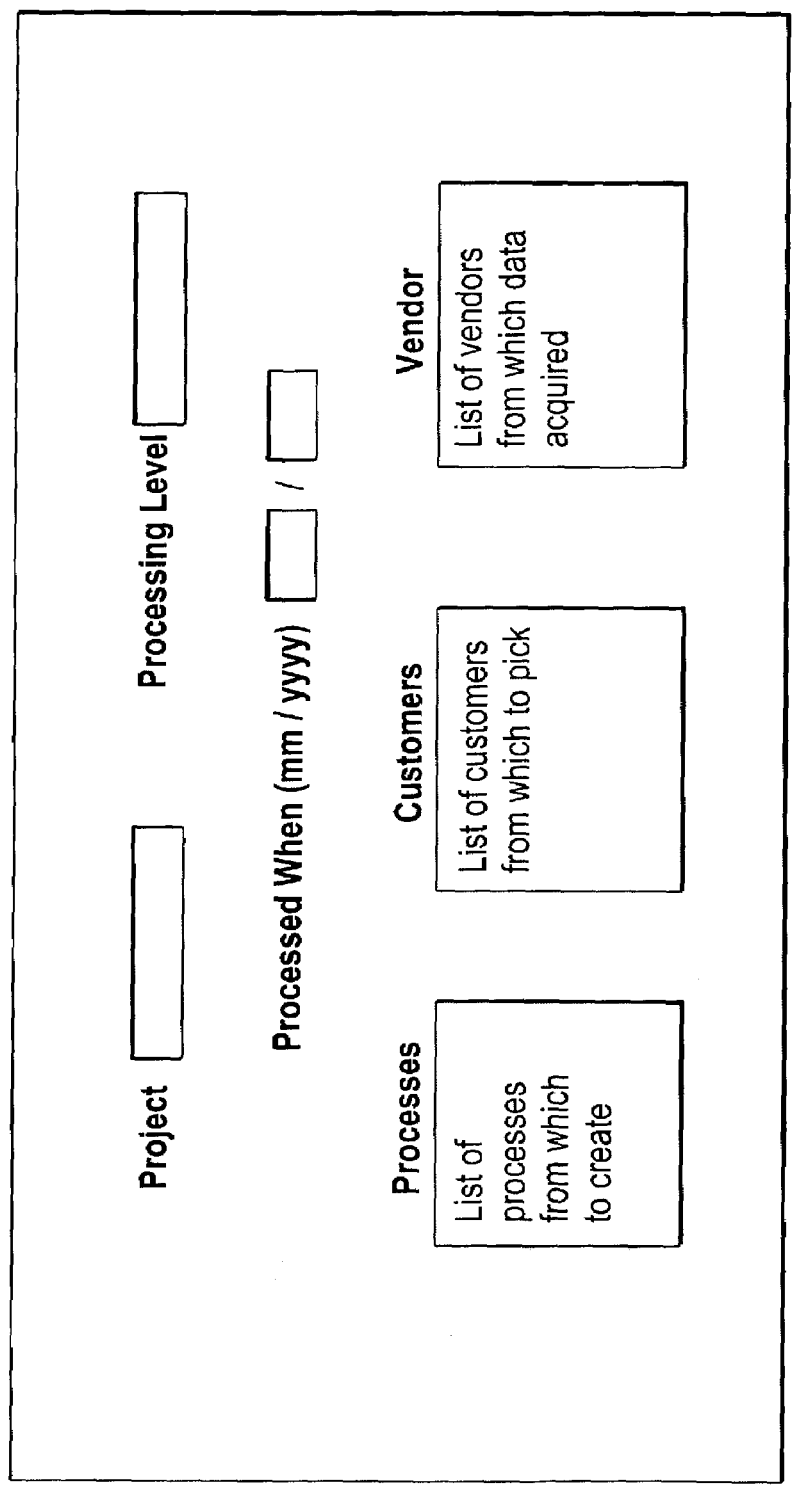

FIG. 11 is a schematic diagram one embodiment of the Processing Subscreen of the Archive Options screen of the graphical user interface aspect of the invention.

Figure 12:
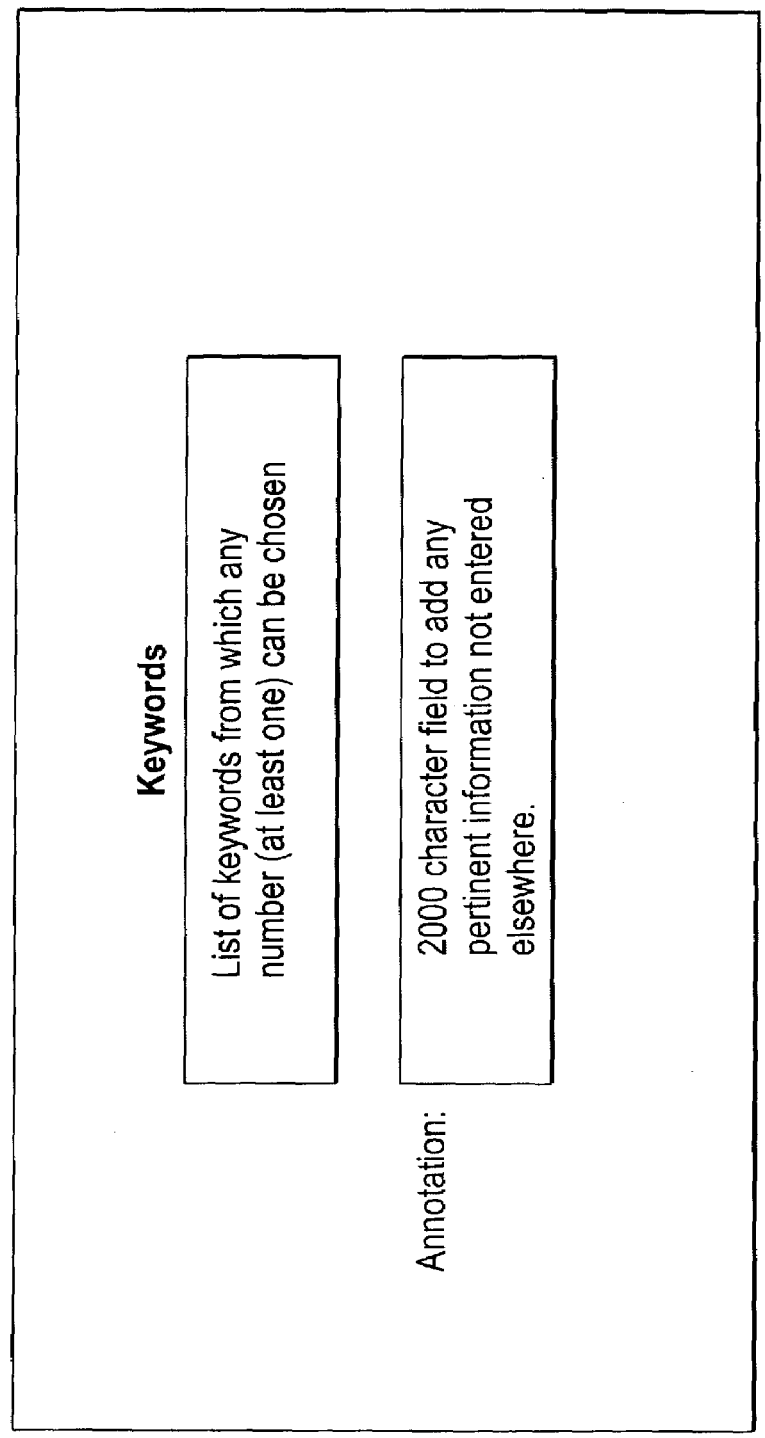

FIG. 12 is a schematic diagram one embodiment of the General Subscreen of the Archive Options screen of the graphical user interface aspect of the invention.

Figure 13:
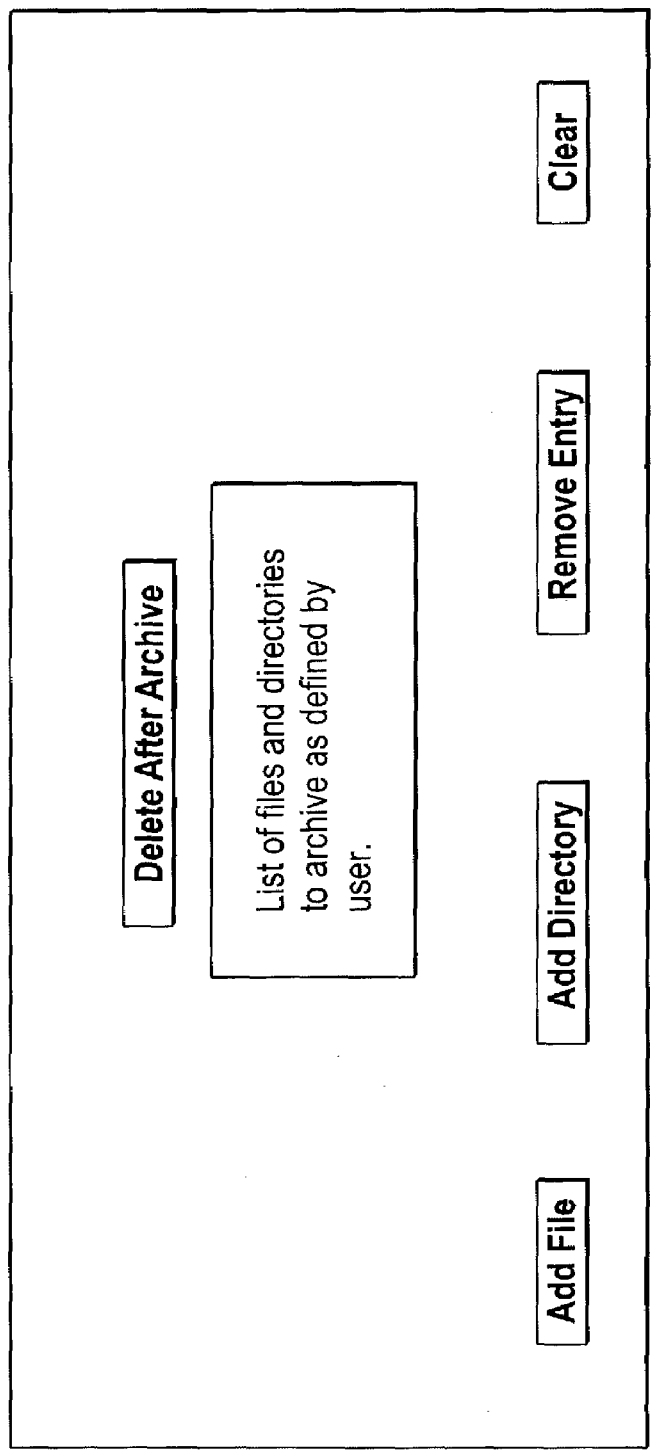

FIG. 13 is a schematic diagram one embodiment of the Files Subscreen of the Archive Options screen of the graphical user interface aspect of the invention.

FIG. 14 is a schematic diagram one embodiment of the Query Definition Form of a Query/Retrieve Options screen of the graphical user interface aspect of the invention.

FIG. 15 is a schematic diagram one embodiment of the Query Results Form of a Query/Retrieve Options screen of the graphical user interface aspect of the invention.

Figure 16:
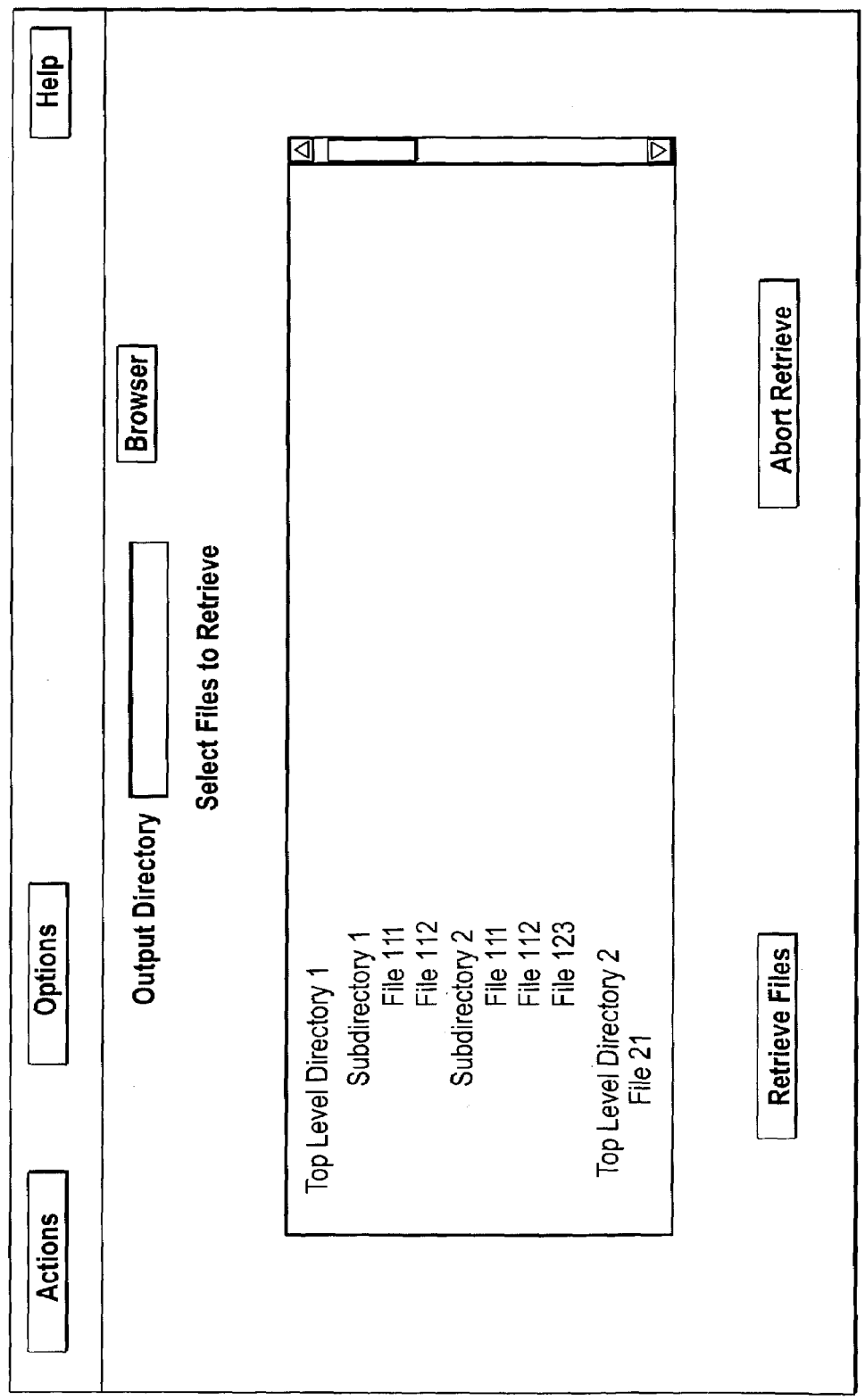

FIG. 16 is a schematic diagram one embodiment of the List Files Form of a Query/Retrieve Options screen of the graphical user interface aspect of the invention.

V. DETAILED DESCRIPTION OF PREFERRED EMBODIMENTS

A. Introduction

The following discussion and figures include a general description of a suitable computing environment in which the invention may be implemented. While the invention will be described in the general context of an application program that runs on an operating system in conjunction with a personal or other computer, those skilled in the art will recognize that the invention also may be implemented in combination with other program modules. Generally, program modules include routines, programs, components, data structures, etc. that performs particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

B. System Architecture

Figure 1:
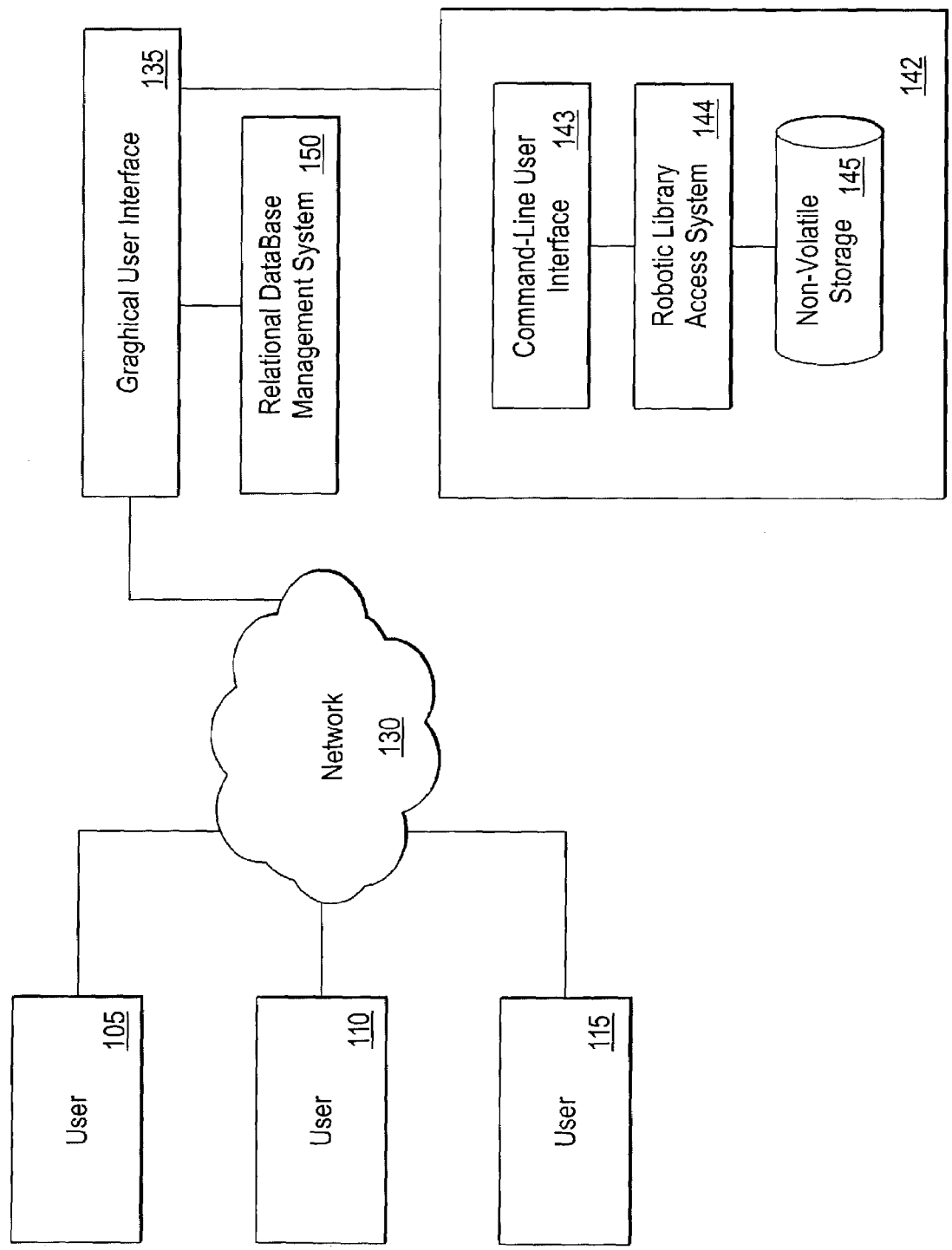
FIG. 1 is a schematic block system diagram of one embodiment of the invention.

FIG. 1 is a schematic block system diagram of one embodiment of the invention. Each entity involved in the method, in one embodiment, is depicted. The various components and participants using the system are interconnected via Network 130. Various users are depicted as user 105, 110, and 115. Graphical User Interface is connected to Network 130, to Relational DataBase Management System 150, and to Robotic Data Storage Data System 142. Robotic Data Storage Data System 142 includes Command-line User Interface 143, Robotic Library Access System 144, and Non-Volatile Storage 145.

Figure 2:
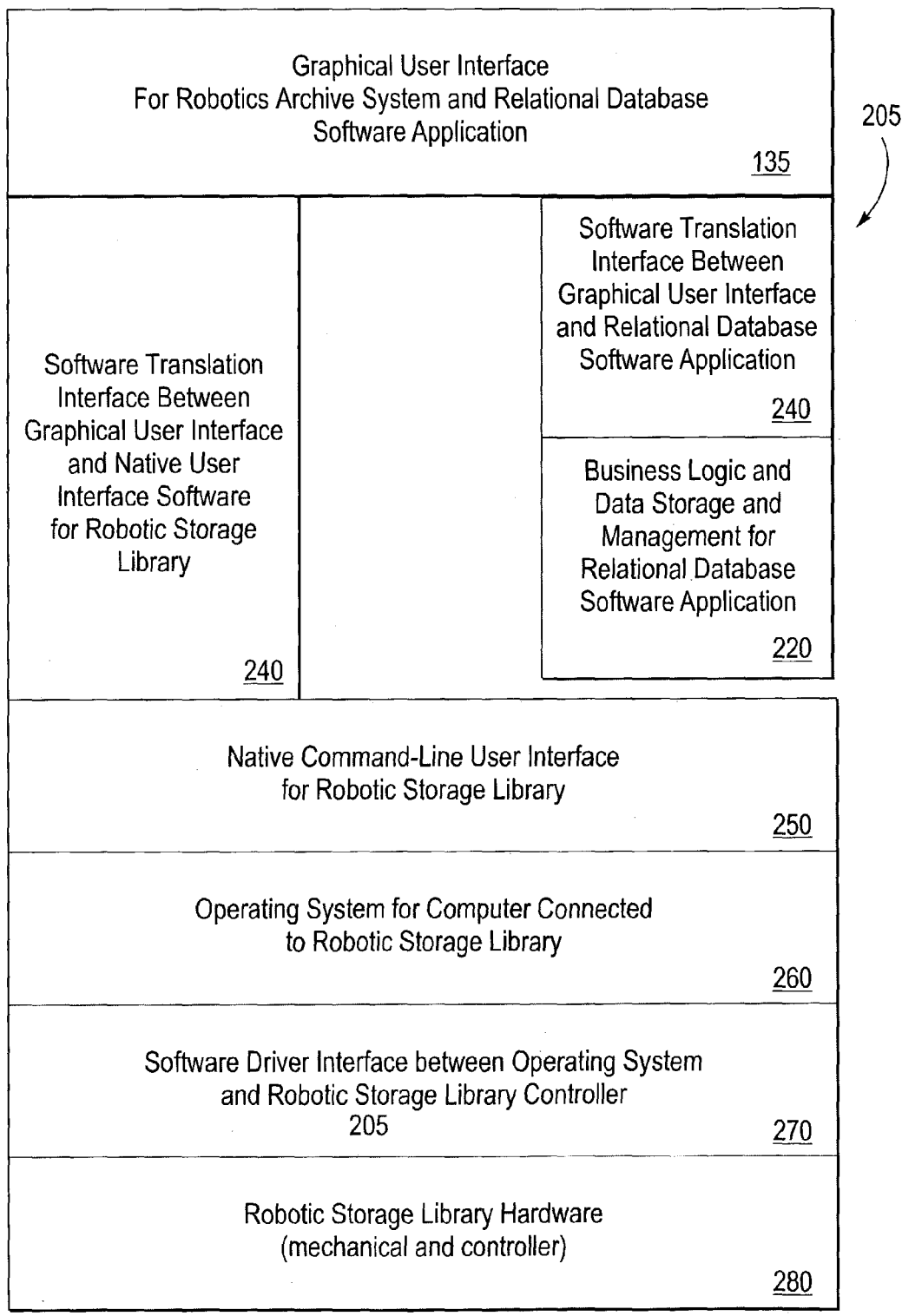
FIG. 2 is a schematic block diagram of the basic architecture of one embodiment of the invention.
Figure 3:
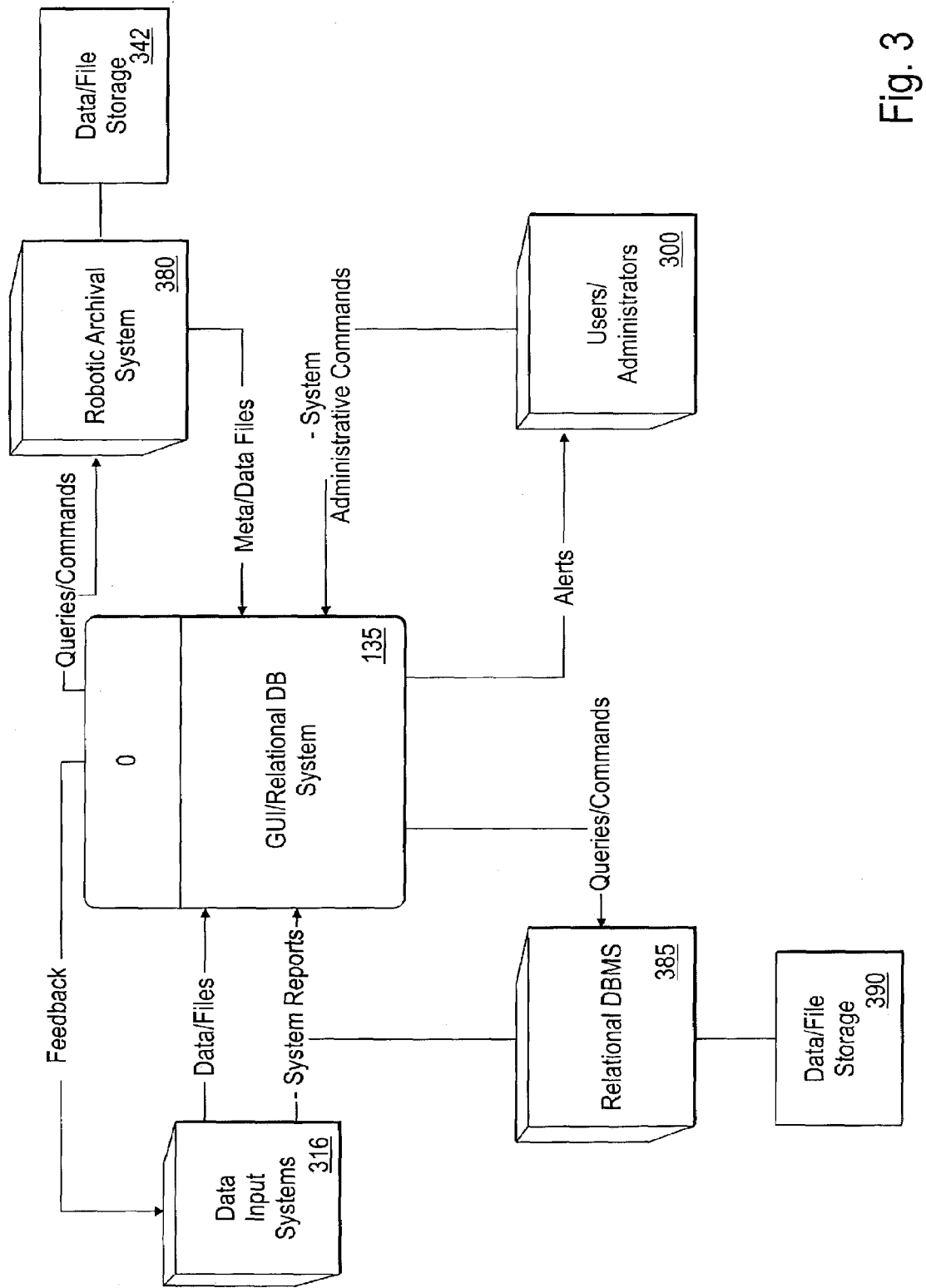
FIG. 3 is a schematic block context diagram of one embodiment of the invention.

Further description of the relationship between these entities is provided in FIGS. 2 and 3. Network 130 is optionally a wired or wireless local area network, a metropolitan area network, or a wide area network, such as the Internet or other public or private networks or combinations thereof. The scope of the network is determined by various factors such as distance between network nodes, security, data traffic demands, desired response times, and other known network engineering considerations. The communication of all entities through a common Network 130 is illustrative only, and the invention includes embodiments where some entities communicate through one network, other entities through a different network, and various permutations thereof.

The communication links between the nodes preferably comprise a cable, fiber or wireless link on which electronic signals can propagate. For example, each node may be connected via a local area network using a 10 Mbps, 100 Mbps, or 1 Gbps Ethernet protocol. A wide area network may use an Internet connection using TCP/IP protocols over a public switched telephone network (PSTN), such as those provided by a local or regional telephone operating company. Alternatively, each node may be connected by dedicated data lines, cellular, Personal Communication Systems ("PCS"), microwave, or satellite networks.

FIG. 2 is a schematic block diagram of the basic architecture of one embodiment of the invention. This layer-style diagram depicts which components interface with one another and the level of each component relative to the user versus the hardware. Starting from the lowest layer, Robotic Tape Robotic Library Hardware 280 receives operating signals from Software Driver Interface 270. Software Driver Interface 270 is passed commands from the Native (or after-market) Command-Line User Interface for Robotic Storage Library 250 by way of Operating System for Computer Connected to Robotic Storage Library 260. The Command-Line User Interface 250 may be one included by the hardware manufacturer of the Robotic Storage System or may be a third-party package useful for one or more Robotic Storage Systems. Sample manufacturers of Robotic Storage System hardware include Overland Data, Inc. Samples of third-party command-line user interface vendors include Legato Systems, Inc. Now going to the top of the layers, Graphical User Interface 135 is an event-driven interface receiving input from a user. User events are passed by way of Software Translation Interface Between Graphical User Interface and Native User Interface Software 240 to the Native Command-Line User Interface 250. Metadata stored for aiding a user in selecting files stored in the Robotic Storage Library 280 is maintained by Business Logic and Data Storage and Management for Relational Database Software Application 220. The user also uses the Graphical User Interface 220 to create metadata records for the archive files stored in Robotic Storage Library 280 and to search the metadata. The translation between the Graphical User Interface 220 and Business Logic and Data Storage and Management for Relational Database Software Application 220 occurs via Translation Interface 240.

FIG. 3 is a schematic block context diagram of one embodiment of the invention. This is a related but alternative view to that of FIG. 1. In FIG. 3, the GUI 135 is shown at the center. Those blocks on surrounding and connected to the GUI 135 interact with it in some way, typically, either receiving data or services or providing data or services to GUI 135. Data Input Systems 316 provides data or files to GUI 135. Relational DBMS ("database management system") block 385 depicts the "back end" storage and maintenance portions of the DBMS (block 240 in FIG. 2) as opposed to the translation interface (block 220 in FIG. 2).

Various queries and commands pass from GUI 135 to Relational DBMS 385 and various responses to those queries and commands pass back to GUI from Relational DBMS 385. Commands received would include creating or searching records stored in Data/File storage 390. Data/File storage 390 is any conventional hardware and/or software for storing data of database in known architectures of relational databases. Similarly Robotic Archival System 380 (also called interchangeably Robotic Storage System) receives command/queries from and passes metadata/files to GUI 135 or a designated location.

Files are stored in and retrieved from Physical Data/File Storage 342. Users/administrators 360 access GUI 135 and perform such actions as enter or select data, retrieve files, or perform system administration. Typically responses or file transfer of Relational DBMS 385 and/or Robotic Archival System 380 are in response to queries posed by users/administrators 360 but are not so limited. That is, business rules for automatic generation or delivery of reports or files may be included, e.g., regularly scheduled status reports.

C. Method of Use of the System

Figure 4:
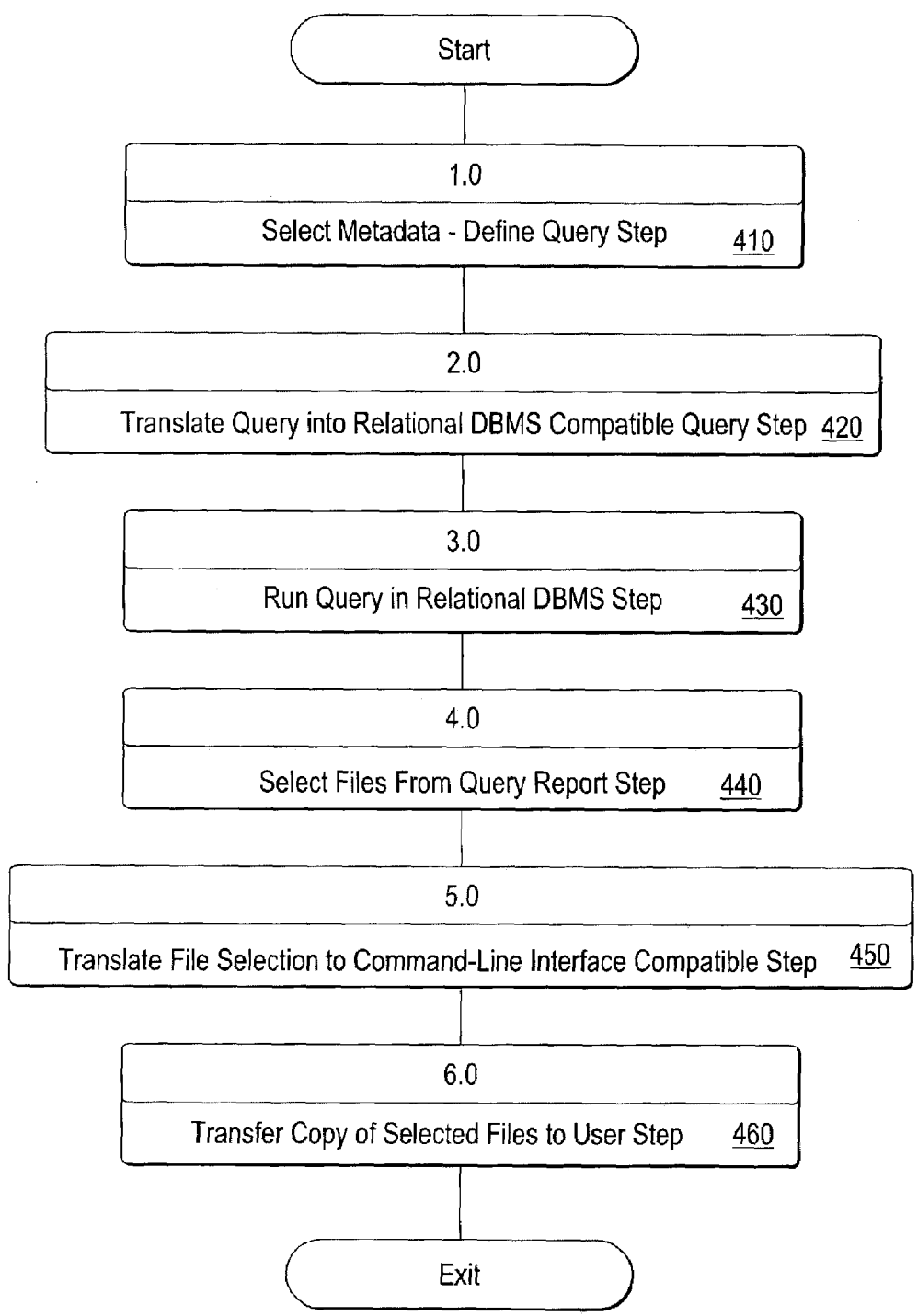
FIG. 4 is a schematic process model, level 0 data flow diagram of one embodiment of the data retrieval aspect of the invention.

FIG. 4 is a schematic process model, level 0 data flow diagram of one embodiment of the data retrieval aspect of the invention. A user via the Graphical User Interface selects metadata and/or defines a query in Step 410. The selected metadata is specific to the data of interest, e.g., data for a specific geographic region or data collected during a specific time period. Selection or query definition is done by any conventional GUI means. This includes, e.g., selections via drop-down boxes, entering text into a text box, selecting check boxes or radio buttons.

After the metadata is entered or query defined it is next translated into a relational DBMS compatible form in Step 420. This comprises storing the selected metadata or query terms and writing those terms into the command-line form compatible for the specific Relational Database Management System ("DBMS") is being used. Various implementations of this functionality are possible using conventional programming methods. Typically, a DBMS provides API methods for facilitating this translation.

In step 430, the DMBS runs the query and locates files meeting the query conditions. The DMBS returns a query report to the GUI which displays it to the user. The report contains a selectable list of files meeting the query. The user may select files from the query report in Step 440. Selection is by any conventional means of GUI technology as discussed above relative to Define Query Step 410.

The selected files or reference thereto, is passed to a translation module in Step 450. Here the file selection is translated into a format compatible to the command-line Interface used by the Robotic Storage System. Various means are available to construct this functionality. If an API is not provided, then in a command-line Interface running on the UNIX platform, e.g., this can be done using known shell-scripting methods. The last step is to transfer a copy of the selected files to the user or location designated by, or accessible to, the user in Step 460.

Figure 5:
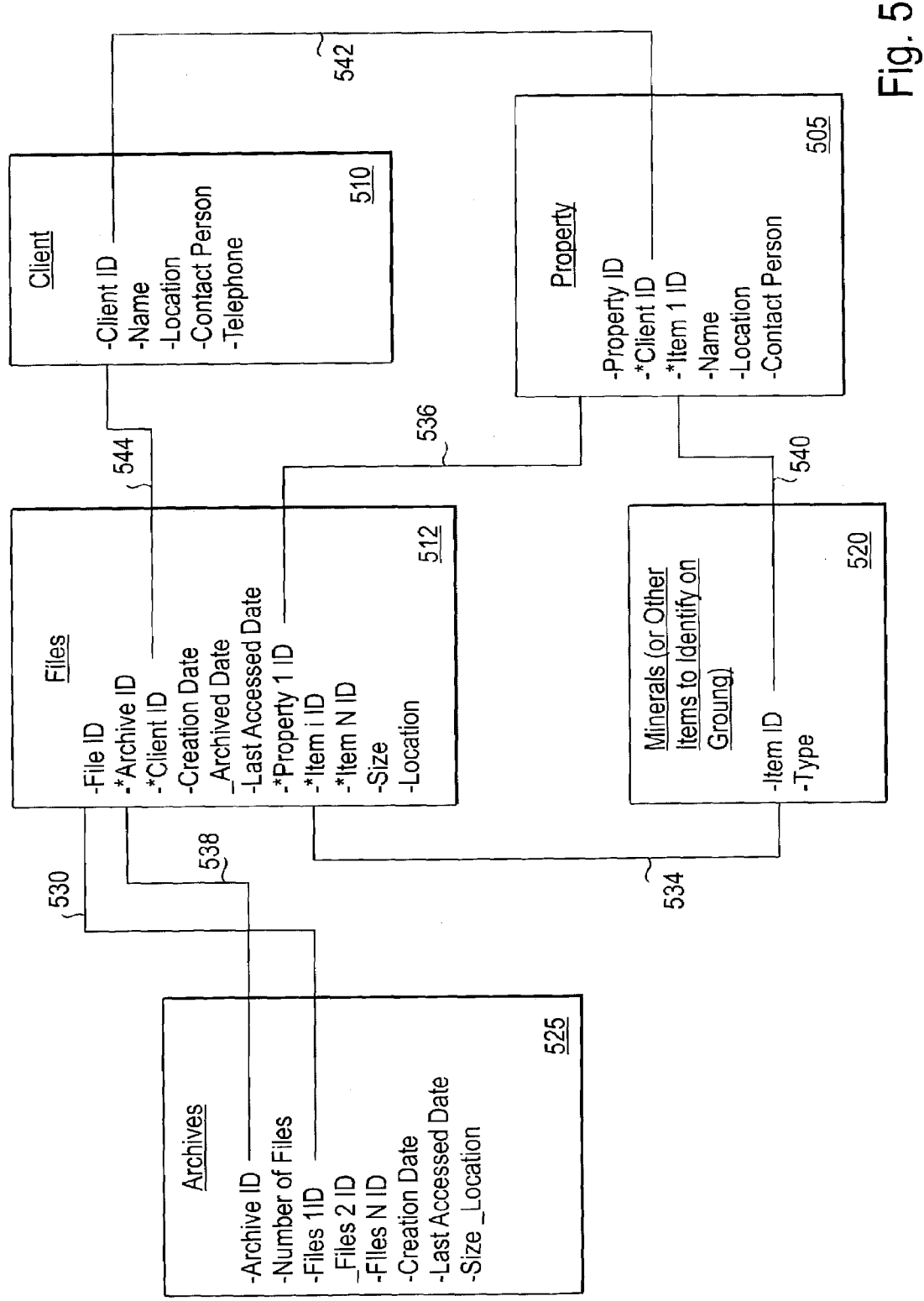
FIG. 5 depicts a Conceptual Data Model in one embodiment of the invention, simplified view of tables, attributes, and relationships for implementing the database aspects of the invention.

FIG. 5 depicts a Conceptual Data Model in one embodiment of the invention, a simplified view of tables, attributes, and relationships for implementing the database aspects of the invention. That is, the metadata can be stored in various tables. In this exemplary conceptual data model there are five tables—Archive Table 525, Files Table 512, Client Table 510, Property Table 505, an Minerals (or Other Items to Identify on The Ground) Table 520. Each table contains one or more attributes, at least one of which is a primary key for uniquely identifying a specific record (i.e., row) in that table. Each table is linked to (i.e., is related to) at least one other by a foreign key. With such a data model, a user can, e.g., search for all files of a specific client or all files identifying certain minerals or all files of a certain date, and various combination or permutations of such searches which are well known to those skilled in relational database design and administration. Modification of the shown tables as well as additional tables, their domains, keys, and links to other tables, and associated queries and reports, and appropriate normalization of each, useful in implementing the databases used in the invention, given the disclosure herein, could be implemented by database designers of ordinary skill in the art.

Figure 6:
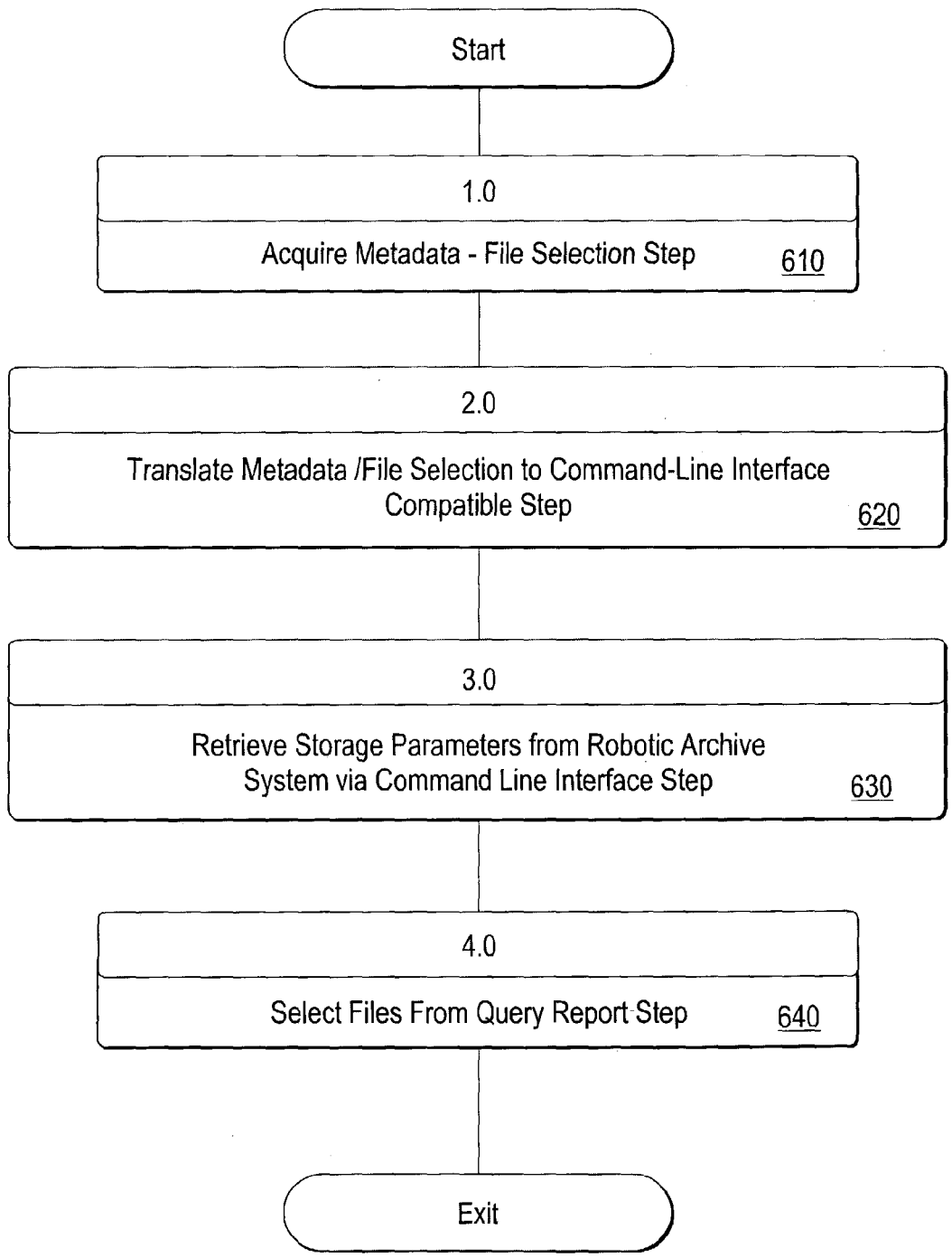
FIG. 6 is a schematic process model, level 0 data flow diagram of one embodiment of the data archiving aspect of the invention.

FIG. 6 is a schematic process model, level 0 data flow diagram of one embodiment of the data archiving (or archive creation) aspect of the invention. Metadata for populating the tables of the data model is acquired and corresponding file identifiers are selected in Step 610. This metadata is translated in Step 620 into a format compatible for use by the Command-Line Interface of the Robotic Storage System. Storage parameters for the relevant files are retrieved from the Robotic Storage System via its Command-Line Interface in Step 630. In Step 640 this storage data and metadata acquired in Step 610 is merged for final insertion into the DBMS as new records.

FIGS. 7–16 are exemplary implementation specifications and screens for implementing the user interface aspect of the invention. The invention is not limited to this implementation and can be implemented in numerous other ways as will be understood by those skilled in the art.

Figure 7:
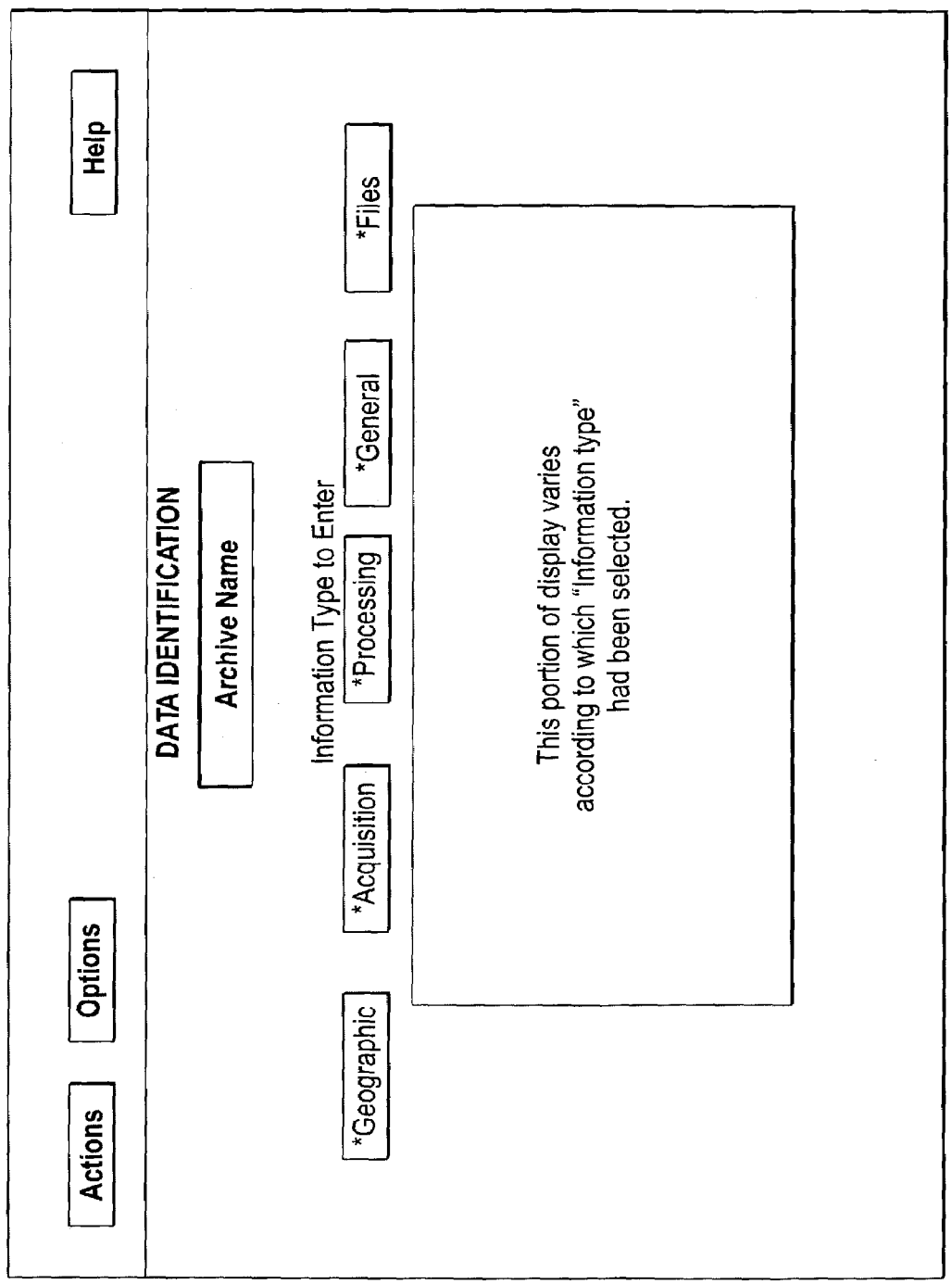
FIG. 7 is a schematic diagram one embodiment of the Archive Options screen of the graphical user interface aspect of the invention.

FIG. 7 is a schematic diagram one embodiment of the Archive Options screen of the graphical user interface aspect of the invention. This screen is used for creating Archives. There are Actions, Options, Help buttons which have drop-down menus shown in FIGS. 8*a–c*. A user enters an archive name in the text box next to the "DATA IDENTIFICATION" label. Archive names are a sixty four (64) character general description of the data. It must be unique among all archives. Then a user may select the information type to enter from the buttons labeled Geographic, Acquisition, Processing, General; and Files. The display on the lower subscreen will vary depending on which of the five information-type buttons is selected.

FIGS. 8*a*, 8*b*, and 8*c* are schematic diagrams of one embodiment of the selectable list functionality available via the Actions, Options, and Help buttons, respectively, of the Archive Options screen of the graphical user interface aspect of the invention. The Action button has the following drop-down menu: Create Archive, Query Database, List Files, Retrieve Files, File Input, and Quit. The Options button has the following drop-down menu: Archive and Query/Retrieve. The drop-down menu for the help button is preferably context sensitive and will change depending on the other objects on the screen. An indicator such as shading or an arrow denotes a selected option on any drop-down menu. All drop-down menus may be context sensitive and some menu items may be inactive on some screens. Inactive menu items can be denoted by "graying out."

FIG. 9 is a schematic diagram one embodiment of the Geographic Subscreen of the Archive Options screen of the graphical user interface aspect of the invention. It has buttons or scrolling lists for Hemisphere and Continent. Selectable lists of countries, states, and/or provinces are presented in the list boxes below the Hemisphere and Continent buttons and permit a user to select one from each. The state list will depend on which country in the country list is selected. All items are required with each having an unknown option. Country and state lists have an option to add new entries. Continent, country, and state values are retrieved from tables of the database.

FIG. 10 is a schematic diagram one embodiment of the Acquisition Subscreen of the Archive Options screen of the graphical user interface aspect of the invention. There is an entry area for the date the data was acquired and text entry boxes for path, row, vendor ID, and another ID.

There is List of sensors from which to select and an archive may contain data from one or more sensors. There are navigation buttons such as Previous, Next, Specify Another Sensor, and Remove Sensor. These buttons are active or inactive as necessitated by input data.

FIG. 11 is a schematic diagram one embodiment of the Processing Subscreen of the Archive Options screen of the graphical user interface aspect of the invention. It has text boxes labeled Project, Processing Level, Processing Date, Processor, Customer, and Vendor.

FIG. 12 is a schematic diagram one embodiment of the General Subscreen of the Archive Options screen of the graphical user interface aspect of the invention. There is a text entry box or list selection box labeled "Keywords" where a user selects or enters a list of keywords as metadata for the archive to permit searching for an archive based on the selected keywords. Additionally, there is a text box labeled "Annotation" which permits entry of up to 2000 characters in order to add any pertinent information not entered elsewhere. The user has an option to add new values to the keywords choices. The keywords list is populated from a table in the database.

FIG. 13 is a schematic diagram one embodiment of the Files Subscreen of the Archive Options screen of the graphical user interface aspect of the invention. This screen provides button for Delete After Archive, Add File, Add Directory, Remote Entry, and Clear. A user can enter a List of files and directories to archive. The user can choose to delete files once archived or leave them on the system.

After all information has been entered, the user selects the "Create Archive" option under the "Actions" menu button. The program examines the entered information and informs the user of any errors as omissions that the user can rectify. Once rectified, he chooses the "Create Archive" option once again. When the input passes edit a synopsis of the parameters specified is presented to the user to have him check for errors/typos. If everything is okay the user tells the program to continue; otherwise, the user can go back to the input screens to modify the input. Using the user's parameters the program builds a C shell script that is executed and performs the following:

(1) Creates a sub-directory in a directory on a file system used exclusively for archiving data. This directory in located on the machine that acts as the server for the archiving software (LEGATO brand). (2) Copies the files/directories to be archived to this subdirectory. After successful copying, the files/directories are deleted from their original locations if "DELETE AFTER ARCHIVE" has been specified. (3) Creates a file containing a list of all files to be archived. (4) Executes the Archive command. (5) Confirms successful completion of Archive command. Terminates job if archive unsuccessful. (6) Deletes sub-directory and its contents, if user so instructed. (7) Executes archive software command to obtain ID of data on tapes, tape to which data were archived, size of archive and number of files archived. (8) Inserts records in the database (ORACLE) that contain the information from the previous step, from the file of files archived, and from the other parameters specified by the user.

FIG. 14 is a schematic diagram one embodiment of the Query Definition Form of a Query/Retrieve Options screen of the graphical user interface aspect of the invention. It provides Actions, Options, and Help buttons. The Query Definition Form Name includes the following fields: Annotation, Project, Processor, Customer, Archive Date, and File Name. There are check boxes for each field as follows: Field, Show Field, Specify Criteria, Sort Field, Display Order, and Sort Order.

The Field column lists the different information that can be displayed as a result of a query of the archive database (ORACLE). Any of these fields may also be used to determine what subset of the data in the database is to be displayed. There is a FIELD row corresponding to every data entry field in the ARCHIVE OPTION set of screens plus the archive date.

The SHOW FIELD column consists of a check box for each FIELD entry. When checked, the query will display information relating to that field. At least one check box must be checked.

The SPECIFY CRITERIA column consists of a checkbox for each FIELD row. When checked, the user can specify bounds for the data type checked. (e.g. return only information about data with an ACQUISITION (DATE) later than Jun. 10, 1998). The way the bounds are expressed depends on the field chosen.

The SORT FIELD column consists of a drop list button for each FIELD row with choices of NONE, ASC (ascending), and DSC (descending). When ASC or DSC is chosen, the query results for that particular FIELD are sorted in the specified order. This column is active for a particular field only if the SHOW FIELD or SPECIFY CRITERIA box has been checked.

The DISPLAY ORDER column consists of a text field for which only numeric entries are allowed. It is active for a particular FIELD row only if the SHOW FIELD checkbox has been checked. The results of a query are displayed as a row of information for each set of data returned by the query. The columns correspond to the SHOW FIELD boxes that have been checked. By default the order in which the FIELDS are displayed is the order they appear in the QUERY DEFINITION FORM. This order may be changed by making entries in this column's text box. When non-blank positive entries exist, the display order will be as follows: FIELDS having non-blank positive entries in the DISPLAY ORDER column are displayed first in ascending numeric order followed by all remaining FIELDS in the default order.

The SORT ORDER column consists of a text field for which only numeric entries are allowed. It is active for a particular FIELD row only if the SHOW FIELD checkbox has been checked and SORT FIELD is either ASC or DSC. Entries in this column establish order of the sorting. By default the data are first sorted in the order selected on the QUERY DEFINITION FORM for which SORT FIELD is ASC or DSC. It is then sorted by the next row that has SORT FIELD set to ASC or DSC. If any of the SORT ORDER text fields are non-blank with positive numeric entries, sorting proceeds in ascending order of the values in the SORT ORDER fields.

The QUERY DATABASE button pressed or ACTIONS/QUERY DATABASE selection on the menu bar is made when the query has been fully defined. If SPECIFY CRITERIA check boxes have been checked, dialog windows will appear to obtain the user desired criteria. The program then builds a SQL statement as defined by the QUERY DEFINITION FORM and any criteria gleaned from the user. The SQL is submitted to the database via programming interface (IDL) with the database (ORACLE). The returned results are displayed in the Query Results Form.

FIG. 15 is a schematic diagram one embodiment of the QUERY RESULTS FORM of a Query/Retrieve Options screen of the graphical user interface aspect of the invention. It has Actions, Options, and Help buttons.

Under a heading of "Query Result Form" there is a list of the Number of Records Returned. Each record is displayed with a column for each SHOW FIELD box that was checked on the QUERY DEFINTION FORM. At the screen bottom are buttons for List Files, Print Query, Results, and New Query.

The QUERY RESULTS FORM displays the results of the query in a scrolled window with column headings repeated frequently enough so that they are always visible in the scrolled window.

The LIST FILES button (or ACTIONS/LIST FILES on the menu bar) generates an SQL statement that is submitted to the database to return a list of all the files in the archive sets that have been selected. Each row of the query results represents a file or directory. Individual rows can be selected in a MS Windows type fashion.

The PRINT QUERY RESULTS button will print the contents of the scroll window to the default printer. The NEW QUERY button will return to the QUERY DEFINITION FORM from which a new query can be executed.

FIG. 16 is a schematic diagram one embodiment of the LIST FILES FORM of a Query/Retrieve Options screen of the graphical user interface aspect of the invention. It has Actions, Options, and Help buttons along the top. There is a text box labeled "Output Directory" for entry of the desired output location. The output directory can also be selected using the "Browse" button. In the window labeled "Select Files to Retrieve" is a selectable list of files returned by the query. At the bottom are buttons for "Retrieve Files" and "Abort Retrieve."

E. Other Implementation Details

1. Terms

The detailed description contained herein is represented partly in terms of processes and symbolic representations of operations by a conventional computer. The processes and operations performed by the computer include the manipulation of signals by a processor and the maintenance of these signals within data packets and data structures resident in one or more media within memory storage devices. Generally, a "data structure" is an organizational scheme applied to data or an object so that specific operations can be performed upon that data or modules of data so that specific relationships are established between organized parts of the data structure.

A "data packet" is a type of data structure having one or more related fields, that are collectively defined as a unit of information transmitted from one device or program module to another. Thus, the symbolic representations of operations are the means used by those skilled in the art of computer programming and computer construction to most effectively convey teachings and discoveries to others skilled in the art.

A typical "personal computer" or "workstation" a user might log on would include typical components such as a bus for communicating information, and a processor coupled with the bus for processing information, random access memory, coupled to the bus for storing information and instructions to be executed by the processor. RAM also may be used for storing temporary variables or other intermediate information during execution of instructions by the processor, a read only memory coupled to the bus for storing static information and instructions for the processor, and a data storage device coupled to the bus for storing information and instructions. The data storage device may include a magnetic disk or optical disk and its corresponding disk drive can be coupled to the computer system. Also the system may be coupled via the bus to a display device, such as a cathode ray tube, for displaying information to a computer user. The computer system further includes a keyboard and a cursor control, such as a mouse. Any other access devices for accessing a network are intended to be included in the invention. Such devices include properly equipped and configured cellular phones and personal digital assistants For the purposes of this discussion, a "process" is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, packets, nodes, numbers, points, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as issuing, sending, altering, adding, disabling, determining, comparing, reporting, and the like, which are often associated with manual operations performed by a human operator. The operations described herein are machine operations performed in conjunction with various inputs provided by a human operator or user that interacts with the computer.

2. Hardware

It should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in specific network architecture with hard-wired logic or programs stored in nonvolatile memory, such as read only memory.

3. Program

In the preferred embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The foregoing system may be conveniently implemented in a program or program module(s) that is based upon the diagrams and descriptions in this specification. No particular programming language has been required for carrying out the various procedures described above because it is considered that the operations, steps, and procedures described above and illustrated in the accompanying drawings are sufficiently disclosed to permit one of ordinary skill in the art to practice the present invention.

Moreover, there are many computers, computer languages, and operating systems which may be used in practicing the present invention and therefore no detailed computer program could be provided which would be applicable to all of these many different systems. Each user of a particular computer will be aware of the language and tools which are most useful for that user's needs and purposes.

The invention thus can be implemented by programmers of ordinary skill in the art without undue experimentation after understanding the description herein.

4. Product

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

5. Components

The major components (also interchangeably called aspects, subsystems, modules, functions, services) of the system and method of the invention, and examples of advantages they provide, are described herein with reference to the figures. For figures including process/means blocks, each block, separately or in combination, is alternatively computer implemented, computer assisted, and/or human implemented. Computer implementation optionally includes one or more conventional general purpose computers having a processor, memory, storage, input devices, output devices and/or conventional networking devices, protocols, and/or conventional client-server hardware and software. Where any block or combination of blocks is computer implemented, it is done optionally by conventional means, whereby one skilled in the art of computer implementation could utilize conventional algorithms, components, and devices to implement the requirements and design of the invention provided herein. However, the invention also includes any new, unconventional implementation means.

6. Web Design

Any web site aspects/implementations of the system include conventional web site development considerations known to experienced web site developers. Such considerations include content, content clearing, presentation of content, architecture, database linking, external web site linking, number of pages, overall size and storage requirements, maintainability, access speed, use of graphics, choice of metatags to facilitate hits, privacy considerations, and disclaimers.

7. Other Implementations

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A system for hyperspectral imaging data file archival management comprising:
   (a) a server;
   (b) a business logic software code portion resident in the memory of the server, configured and adapted for managing and searching a relational database containing metadata about hyperspectral imaging data files stored in a robotic archive system having multiple non-volatile storage media, input and output means for reading and writing to the storage media, adapted and configured for storing hyperspectral imaging data files, and having a command-line software code portion adapted and configured to provide a command-line user interface to control the robotic data storage system;
   (c) a GUI software code portion resident in the memory of the server configured and adapted for providing over a network to a personal computer client or workstation client a graphical user interface to at least a portion of the business logic software code portion; and
   (d) a translation software code portion resident in the memory of a server adapted and configured for translating management and search messages from a format compatible with the business logic code portion into and from a format compatible with the command-line code portion the robotic data storage system.

2. The system of claim 1, wherein the hyperspectral imaging data files are cumulatively at least one gigabyte.

3. The system of claim 1, wherein the storage media of the robotic data storage system is selected from the group consisting of magnetic tape, compact disc, digital versatile disc, and mixtures thereof.

4. The system of claim 1, wherein the graphical user interface comprises a graphical user interface to the record adding and record searching portions of the business logic software code portion.

5. The system of claim 4, wherein the graphical user interface further comprises a graphical user interface to record modifying and record deleting portions of the business logic software code portion.

6. A method for data-file archival management comprising:
   (a) receiving user selected or entered metadata of a plurality of hyperspectral imaging data files via a graphical user interface displayed on a client comprising a personal computer or workstation, wherein the hyperspectral imaging data files are stored in a robotic archival system;
   (b) storing the metadata in one or more tables of a relational database running on a server connected over a network to the client;
   (c) receiving a query of the relational database by receiving user-selected or entered metadata parameters into the graphical user interface and rendering the query into a query format compatible with the relational database;
   (d) processing the query on the server and returning to and displaying on the client a report listing one or more of the hyperspectral imaging data files meeting the metadata parameters of the query, wherein the report includes a file locator compatible with the robotic archival system for each hyperspectral imaging data file in the report;
   (e) receiving a user selection via the graphical user interface of one or more of the hyperspectral imaging data files in the report;
   (f) translating the selection request to one compatible with the robotic archival system and passing the translated selection request to the robotic archival system; and
   (g) returning a copy of the selected hyperspectral imaging data files over a network from the robotic archival system to the client.

7. The method of claim 6, wherein the plurality of hyperspectral imaging data files cumulatively are at least one gigabyte.

8. The method of claim 6, wherein the plurality of hyperspectral imaging data files cumulatively are at least one terabyte.

9. The method of claim 6, wherein the hyperspectral imaging data file is stored in the robotic archival system on non-volatile storage media selected from the group consisting of magnetic tape, compact disc, digital versatile disc, and mixtures thereof.

10. A system for hyperspectral imaging data file archival management comprising:
    (a) a robotic data storage system having multiple non-volatile storage medium, input and output means for reading and writing to the storage media, adapted and configured for storing hyperspectral imaging data files, and having a command-line software code portion adapted and configured to provide a command-line user interface to control the robotic data storage system;

(b) a server;

(c) a business logic software code portion resident in memory on the server, configured and adapted for adding and searching metadata about the hyperspectral imaging data files, wherein the metadata is organized as a relational database;

(d) a plurality of personal computers or workstation clients connected to the server computer over a network;

(e) a GUI software code portion resident in the memory of the personal computers, workstations, or of a server in communication with the personal computers or workstations, configured and adapted for providing a graphical user interface to the record adding and searching portions of the business logic software code portion; and (f) a translation software code portion resident in the memory of the database server adapted and configured for translating adding and searching messages from a format compatible with the business logic code portion into and from a format compatible with the command-line code portion.

11. The system of claim 10, wherein the business logic software code portion is further configured and adapted for updating and deleting metadata about the hyperspectral imaging data files.

12. The system of claim 11, wherein the GUI software code portion is further configured and adapted for providing a graphical user interface to the record updating and deleting portions of the business logic software code portion.

13. The system of claim 10, wherein the hyperspectral imaging data files are cumulatively at least three gigabytes.

14. The system of claim 10, wherein the hyperspectral imaging data files are cumulatively at least one terabyte.

15. The system of claim 10, wherein the storage media of the robotic data storage system is selected from the group consisting of magnetic tape, compact disc, digital versatile disc, and mixtures thereof.

16. A method for data-file archival management comprising:

(a) selecting or entering metadata of a plurality of hyperspectral imaging data files via a graphical user interface running on a client comprising a personal computer, workstation, or server, wherein the hyperspectral imaging data files are stored in a robotic archival system;

(b) storing the metadata in one or more tables of a relational database running on a server;

(c) querying the relational data by selecting or entering metadata parameters into the graphical user interface that is then rendered in a format compatible with the relational database;

(d) processing the query on the server and returning to and displaying on the client a report of one or more of the hyperspectral imaging data files meeting the metadata parameters of the search, wherein the report includes a file locator for each hyperspectral imaging data file compatible with the robotic archival system;

(e) selecting via the graphical user interface one or more of the hyperspectral imaging data files;

(f) translating the selection request to one compatible with the robotic archival system and passing the translated selection request to the robotic archival system; and (g) returning a copy of the selected hyperspectral imaging data files over a network from the robotic archival system to the client.

17. The method of claim 16, wherein the plurality of hyperspectral imaging data files is at least one gigabyte.

18. The computer-readable media of claim 16, wherein the plurality of hyperspectral imaging data files is at least one terabyte.

19. The method of claim 16, wherein the hyperspectral imaging data file is stored in the robotic archival system on non-volatile storage media selected from the group consisting of magnetic tape, compact disc, digital versatile disc, and mixtures thereof.

20. A computer-readable media tangibly embodying a program of instructions executable by a computer to perform a method of data-file archival management comprising:

(a) computer readable program code means for receiving from a user a selection or input of metadata of a plurality of hyperspectral imaging data files via a graphical user interface, wherein the hyperspectral imaging data file is stored in a robotic archival system;

(b) computer readable program code means for storing the metadata in one or more tables of a relational database;

(c) computer readable program code means for receiving a user query to the relational data by receiving user selections or text entry metadata parameters into a graphical user interface that is then rendered in a format compatible with the relational database;

(d) computer readable program code means for processing the query and returning to and displaying on the user a report of one or more of the hyperspectral imaging data files meeting the metadata parameters of the search, wherein the report includes a file locator for each hyperspectral imaging data file compatible with the robotic archival system;

(e) computer readable program code means for receiving a user selection via the graphical user interface one or more of the hyperspectral imaging data files;

(f) computer readable program code means for translating the selection request to one compatible with the robotic archival system and passing the translated selection request to the robotic archival system; and (g) computer readable program code means for returning a copy of the selected hyperspectral imaging data files over a network from the robotic archival system to the user.

21. The computer-readable media of claim 20, wherein the plurality of hyperspectral imaging data files is at least five gigabytes.

22. The computer-readable media of claim 20, wherein the plurality of hyperspectral imaging data files is at least one terabyte.

23. The computer-readable media of claim 20, wherein the hyperspectral imaging data file is stored in the robotic archival system on non-volatile storage media selected from the group consisting of magnetic tape, compact disc, digital versatile disc, and mixtures thereof.

* * * * *